US012611691B2

(12) United States Patent
Ketterling

(10) Patent No.: US 12,611,691 B2
(45) Date of Patent: Apr. 28, 2026

(54) SPRINKLER RISER EXTENSION KIT WITH INTERNAL PRESSURE REGULATOR

(71) Applicant: Kody J. Ketterling, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 464 days.

(21) Appl. No.: 18/109,242

(22) Filed: Feb. 13, 2023

(65) Prior Publication Data

US 2023/0191438 A1 Jun. 22, 2023

Related U.S. Application Data

(63) Continuation-in-part of application No. 17/080,800, filed on Oct. 26, 2020, now Pat. No. 11,654,447, which is a continuation-in-part of application No. 16/377,199, filed on Apr. 6, 2019, now Pat. No. 10,814,343.

(60) Provisional application No. 63/309,502, filed on Feb. 11, 2022, provisional application No. 62/725,970, filed on Aug. 31, 2018.

(51) Int. Cl.
*B05B 15/656* (2018.01)
*B05B 12/08* (2006.01)

(52) U.S. Cl.
CPC .......... *B05B 15/656* (2018.02); *B05B 12/087* (2013.01)

(58) Field of Classification Search
CPC ..... B05B 12/087; B05B 15/656; B05B 15/70; B05B 15/72; B05B 15/74; F16K 15/067; F16K 15/063; F16K 15/06; F16K 15/028; F16K 15/026; F16K 15/025
See application file for complete search history.

(56) References Cited

U.S. PATENT DOCUMENTS

| | | |
|---|---|---|
| 4,018,386 A | 4/1977 | Barichello |
| D248,568 S | 7/1978 | Ismach |
| D253,245 S | 10/1979 | Allenbaugh, Jr. |
| 4,220,283 A | 9/1980 | Citron |

(Continued)

OTHER PUBLICATIONS

Hunter Sprinkler 8A Pro Adjustable Radius Nozzle, Oct. 18, 2015, Amazon.com, Sep. 1, 2021, URL: https://www.amazon.com/dp/B00FYQWMPQ (Year: 2015).

(Continued)

*Primary Examiner* — Tuongminh N Pham
(74) *Attorney, Agent, or Firm* — Burdick Patents, P.A.; Sean D. Burdick; Colin L. Honan

(57) ABSTRACT

A sprinkler riser extension kit for elevating a sprinkler head and maintaining a fixed constant pressure at an outlet end in an existing pop-up sprinkler is disclosed. The extension kit comprises a gripping head having a channel defined there-through and a riser stem extension enclosing a pressure regulator assembly, the extension stem being slidable through the channel of the gripping head. The gripping head engages a cap of an existing sprinkler and the extension stem engages the sprinkler riser of the existing sprinkler. The pressure regulator assembly defines an internal hollow channel. A valve assembly is integrally connected to a spring circumvolving the channel. The spring exerts a constant downward force on the valve assembly. When under pressure, the valve assembly exerts an opposing force against the spring and the two forces cooperate to maintain a constant pressurized release of fluid at the outlet.

19 Claims, 7 Drawing Sheets

(56) References Cited

U.S. PATENT DOCUMENTS

| | | | |
|---|---|---|---|
| D289,542 S | 4/1987 | Byrne | |
| D293,815 S | 1/1988 | Scott et al. | |
| D296,464 S | 6/1988 | Marmol et al. | |
| 4,919,332 A | 4/1990 | Bailey | |
| D319,291 S | 8/1991 | Hanzel | |
| 5,040,729 A * | 8/1991 | Carrozza | B05B 15/652 239/269 |
| 5,133,501 A | 7/1992 | Marshall | |
| 5,226,599 A | 7/1993 | Lindermeir et al. | |
| RE35,037 E | 9/1995 | Kah, Jr. | |
| D384,484 S | 9/1997 | Ibarra et al. | |
| 5,918,812 A | 7/1999 | Beutler | |
| 5,996,905 A | 12/1999 | Bedford | |
| 6,000,632 A | 12/1999 | Wallace | |
| 6,050,500 A | 4/2000 | Ensworth | |
| 6,138,924 A | 10/2000 | Hunter et al. | |
| 6,193,168 B1 | 2/2001 | Bedford | |
| 6,478,237 B2 | 11/2002 | Kearby et al. | |
| 6,499,678 B1 | 12/2002 | Hope | |
| 6,502,764 B2 | 1/2003 | Walker | |
| 6,629,648 B1 | 10/2003 | Jones | |
| 6,641,177 B1 | 11/2003 | Pinciaro | |
| 6,648,241 B1 | 11/2003 | Doshay | |
| 6,874,696 B1 | 4/2005 | Ericksen et al. | |
| D616,961 S | 6/2010 | Goetz | |
| 7,832,659 B1 | 11/2010 | Collins | |
| 8,430,339 B2 | 4/2013 | Stewart et al. | |
| D683,425 S | 5/2013 | Koiwa | |
| D721,419 S | 1/2015 | Koiwa | |
| D734,868 S | 7/2015 | Gilboa | |
| 9,192,956 B2 | 11/2015 | Kah et al. | |
| D757,933 S | 5/2016 | Lev et al. | |
| 9,339,438 B2 | 5/2016 | Lev et al. | |
| D765,837 S | 9/2016 | Lev et al. | |
| D767,124 S | 9/2016 | Lev et al. | |
| 9,481,003 B2 | 11/2016 | Clark et al. | |
| 9,539,602 B2 | 1/2017 | Wright et al. | |
| 9,699,974 B2 | 7/2017 | Clark et al. | |
| 9,765,913 B2 | 9/2017 | Magargal et al. | |
| D801,522 S | 10/2017 | Shalom | |
| D861,054 S | 9/2019 | Avila et al. | |
| D883,446 S | 5/2020 | Comstock | |
| 10,806,667 B2 | 10/2020 | Denenburg et al. | |
| D907,176 S | 1/2021 | Qiang | |
| D909,606 S | 2/2021 | Maibach, Jr. | |
| 10,933,434 B1 | 3/2021 | Pfanstiehl | |
| D916,265 S | 4/2021 | Jung et al. | |
| D920,469 S | 5/2021 | Babaie | |
| D921,151 S | 6/2021 | Cho et al. | |
| D924,361 S | 7/2021 | Matsushita et al. | |
| D960,301 S | 8/2022 | Ketterling | |
| D960,308 S | 8/2022 | Ketterling | |
| 2002/0039522 A1 | 4/2002 | Hartmann et al. | |
| 2002/0088878 A1 | 7/2002 | Sirkin | |
| 2006/0000932 A1 | 1/2006 | Gregory | |
| 2007/0119974 A1 * | 5/2007 | Johnson | E03B 7/074 239/203 |
| 2008/0023574 A1 | 1/2008 | Smith | |
| 2008/0087743 A1 | 4/2008 | Govrin et al. | |
| 2008/0230627 A1 | 9/2008 | Stewart et al. | |
| 2009/0188988 A1 | 7/2009 | Walker et al. | |
| 2009/0283615 A1 | 11/2009 | Walker | |
| 2011/0278373 A1 | 11/2011 | Vollrath et al. | |
| 2012/0118405 A1 * | 5/2012 | Kah, Jr. | B05B 15/40 137/505 |
| 2013/0119148 A1 | 5/2013 | Eley et al. | |
| 2013/0168466 A1 | 7/2013 | White | |
| 2014/0203105 A1 | 7/2014 | Hung | |
| 2014/0252123 A1 | 9/2014 | Anuskiewicz | |
| 2019/0308214 A1 | 10/2019 | Anuskiewicz et al. | |
| 2020/0070198 A1 | 3/2020 | Ketterling | |
| 2020/0230626 A1 | 7/2020 | Ketterling | |
| 2021/0053084 A1 | 2/2021 | Ketterling | |

OTHER PUBLICATIONS

Modtek Replacement Pop UP sprinkler Heads, Jun. 7, 2019, Amazon.com, Sep. 1, 2021. URL: https://www.amazon.com/Modtek-replacement-Sprinkler-RainBird-Sprinklers/dp/B07QJTDT2H (Year: 2019).

Orbit 54009 Full Spray Pattern Plastic Shrub Head with Plastic Nozzle, Jun. 11, 2016, Amazon.com, Sep. 9, 2021, URL: https://www.amazon.com/Orbit-54009-Pattern-Plastic-Nozzle/dp/B00004S1TH (2016).

Orbit 54010 Shrub and Plant Sprinkler Head, Jul. 29, 2016, Amazon.com, Sep. 9, 2021, URL: https://www.amazon.com/dp/B00004S1TI (2016).

Orbit 54023 Adjustable Pattern Shrub Head Sprinkler, Sep. 17, 2019, Amazon.com, Sep. 9, 2021, URL: https://www.amazon.com/Orbit-54023-Adjustable-Pattern-Sprinkler/dp/B006ZN225C (2019).

Pop-Up Sprinkler Riser Extension, Aug. 29, 2020, homedepot.com, Sep. 1, 2021, URL:https://www.homedepot.com/p/KAP-IT-Pop-Up-Sprinkler-Riser-Extension-Attach-to-Top-of-Pop-Up-1-5-lift-Pop-Up-Kap-Virtually-NO-Digging-2-pk-Kap-02R/313655761 (Year: 2020).

Amazon ("231 Irrigator-Pro 6.5-Inch Universal Sprinkler SPRAY Riser Extension"). https://www.amazon.com/dp/B07491V94Y/ref=sspa_dk_detail_7?psc=1&pd_rd_i=B07491V94Y&pd_rd_wg=554kv&pd_rd_r=3CZ97A2SA62QZPPFVCPF&pd_rd_w=pZvHF. Apr. 28, 2018.

Amazon: https://www.amazon.com/10-Pack-Cut-off-Sprinkler-Extension/dp/B00LORBMU0. Apr. 28, 2018.

EP Search Report and Written Opinion mailed on Nov. 16, 2022, to EP Patent Application No. 20788430.5.

https://www.doityourself.com/stry/3-sprinkler-riser-types. Apr. 28, 2018.

https://www.irrigationtutorials.com/sprinkler-head-risers/. Apr. 28, 2018.

Installing Risers & Sprinkler Heads: https://www.hometips.com/diy-how-to/sprinkler-heads-risers-installing.html. Apr. 28, 2018.

International Preliminary Report on Patentability issued on Oct. 21, 2021 for PCT/US2020/026731.

International Search Report and Written Opinion issued on May 11, 2020 for PCT/US20/26731.

Sprinkler Fittings: https://www.hometips.com/buying-guides/sprinkler-pipes-fittings.html. Apr. 28, 2018.

Sprinkler Lift product: https://www.sprinklerlift.com. Apr. 28, 2018.

Sprinkler System Store: http://www.sprinklersystemstore.com/sprinkler-systems-sprinkler-system-parts/sprinkler-risers/?sort=alphaasc&page=3. Apr. 28, 2018.

Sprinkler Warehouse: http://www.sprinklerwarehouse.com/Shrub-Sticks-Risers-s/225.htm. Apr. 28, 2018.

Sprinkler Warehouse: https://www.sprinklerwarehouse.com/Riser-Extension-p/37056.htm. Apr. 28, 2018.

How to Raise Sprinkler Heads, retrieved from https://www.youtube.com/watch?v=3xtLARJK0G0 (Sep. 10, 2018).

Kap-It Elevate Don't Excavate, retrieved on Mar. 13, 2024 from https://www.youtube.com/watch?v=xU4BVNyyKM (Mar. 3, 2020).

Rainbird Plastic Spray Head Adapter Nozzle, retrieved from https://www.amazon.ca/dp/B011TMSJHS/ on Mar. 13, 2024 (Aug. 19, 2014).

* cited by examiner

SECTION C-C

SPRINKLER RISER EXTENSION KIT WITH INTERNAL PRESSURE REGULATOR

RELATED APPLICATIONS

This application claims priority to U.S. Provisional Application No. 63/309,502 filed Feb. 11, 2022, and also claims priority as a continuation-in-part of U.S. patent application Ser. No. 17/080,800 filed Oct. 26, 2020, which is a continuation-in-part of U.S. patent application Ser. No. 16/377,199 filed Apr. 6, 2019, which claims priority to U.S. Provisional Application No. 62/725,970 filed Aug. 31, 2018, all of which are incorporated herein by reference in their entirety.

BACKGROUND OF THE INVENTION

Field of Invention

The present invention relates generally to irrigation systems. More particularly, the present invention relates to a retrofit sprinkler riser extension kit having an internal pressure regulator for lawn sprinklers, especially pop-up sprinklers.

Description of Related Art

The heads for pop-up sprinklers in irrigation systems can become buried over time due to soil build-up and grass growth in the area surrounding the head of a sprinkler. This problem is particularly prevalent with irrigation systems installed in lawns and gardens. A sprinkler head that has become buried can result in a blockage of the pop-up action of the sprinkler head or a blockage of water flow, reducing the ability of the sprinkler to provide the desired irrigation coverage.

A conventional solution to this recurring problem is to add a riser extension to the sprinkler. This will typically require a person to dig away the grass and dirt built up around the sprinkler head and remove the sprinkler head from its riser (usually made from PVC). After the sprinkler head has been removed, a riser extension can be added by cutting and cementing the riser extension in place using PCV cement. Once the cement has cured, the sprinkler head can be reinstalled on the riser extension at an elevation above the lawn.

The conventional solution, however, can be time consuming and labor intensive. The time and labor required for the conventional solution is multiplied by the number of sprinklers that need a riser extension installed. Another risk is that dirt and other debris can be introduced into the sprinkler line causing the sprinkler heads to clog and cause other problems later on. Other solutions can involve installing risers internal to the sprinkler head mechanisms, but these are also time consuming because they require removal of the sprinkler cap and a reconstruction of its internal mechanism. Those solutions are also structurally limited to a specific make and model of a sprinkler head.

SUMMARY OF THE INVENTION

The foregoing problems are overcome by a sprinkler riser extension kit according to the present invention. In a basic embodiment, the extension kit comprises two cooperating parts that can be attached to an existing, conventional pop-up sprinkler to raise or otherwise expose the sprinkler head. The two basic parts necessary to implement the most basic version of the present invention are: an external gripping head ("gripping head") and an internal riser stem extension ("riser stem extension"). The gripping head is preferably sized to at least partially cover the cap of a conventional sprinkler head, either in an off-the-shelf condition or in a condition of prior installation in an irrigation system.

In more elaborate and preferred embodiments, the gripping head has an upper and lower end connected by a channel defined through the gripping head. The lower end of the gripping head includes means to attach the gripping head to a cap of an existing sprinkler. The gripping head can at least partially cover the cap of an existing sprinkler and in some embodiments completely cover the cap. In some embodiments, the gripping head has at least one internal void between an inner wall defining the perimeter of the channel and an outer wall defining the outer surface of the gripping head. The inner wall and outer wall preferably have the same axial length. The internal voided area separates the inner wall from the outer wall.

The riser stem extension is movable through the gripping head. Preferably, the riser stem extension slides through the channel like a piston through a cylinder. A top end of the riser stem extension includes a first attachment means designed for attachment to a head of the existing sprinkler. The first attachment means may male threads for threaded engagement with the existing sprinkler head. Alternative attachment means may also be utilized, such as friction-fit, snap-fit or use of some type of locking device, like a pipe clamp.

A bottom end of the riser stem extension is configured to removably engage a cap, the cap having a second attachment means designed for attachment with the existing sprinkler riser after the sprinkler head has been detached. Preferably, the cap frictionally engages the bottom end of the riser stem extension for a secured fitment therein. In alternative embodiments, the engagement may be accomplished by a snap-fit, threaded engagement, or any other conventional attaching means.

The riser stem extension is preferably designed as a hollow cylindrical housing. The riser stem extension encloses a pressure regulator assembly. The pressure regulator assembly has an inlet opening proximate to the bottom end of the riser stem extension. The pressure regulator assembly also has an outlet opening proximate the top end of the riser stem extension. The inlet opening fluidly connects the pressure regulator assembly to the irrigation system while the outlet opening provides a release for fluid traveling through the assembly under sufficient pressure. The inlet and outlet openings are connected by an internal channel defined through the pressure regulator assembly. In preferred embodiments, the internal channel is narrow proximate to the inlet opening and widens as it progress towards the outlet opening.

The pressure regulator assembly includes a valve assembly integrally connected to a spring that circumvolves an exterior surface of the internal channel. The spring exerts a downward compressive force on the valve assembly. Preferably, the spring is designed to exert a constant fixed downward force. The valve assembly is designed to exert an opposing force against the spring. Under no pressure from the irrigation system, the spring will hold the valve assembly in an open position, which connects the inlet and outlet openings via the internal channel. As pressure builds at the inlet opening, the opposing force exerted by the valve assembly increases to partially or fully close the inlet opening. Thus, the spring and valve assembly are designed to cooperate together to ensure a fixed constant pressure at the outlet opening regardless of variations of the pressure at the inlet opening. In some embodiments, the fixed pressure at the outlet opening may be between 40 and 80 pounds per square inch (psi) of pressure.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions disclosed or shown are exemplary only. In the drawings like reference numerals may designate like parts throughout the different views, wherein:

DETAILED DESCRIPTION OF THE DRAWINGS

The foregoing problems installing risers on existing pop-up sprinklers are overcome by a sprinkler riser extension kit according to the present invention. In one embodiment, the kit comprises two cooperating parts: an external gripping head ("gripping head") and an internal riser stem extension ("riser stem extension") that is movable through the gripping head. In preferred embodiments, the riser stem extension houses an internal pressure regulatory assembly and a valve assembly that are designed to provide for a constant regulated pressure of water to be released from the sprinkler regardless of fluctuations in pressure upstream from the riser stem extension. These and other features are described in more detail below.

Figure 1:
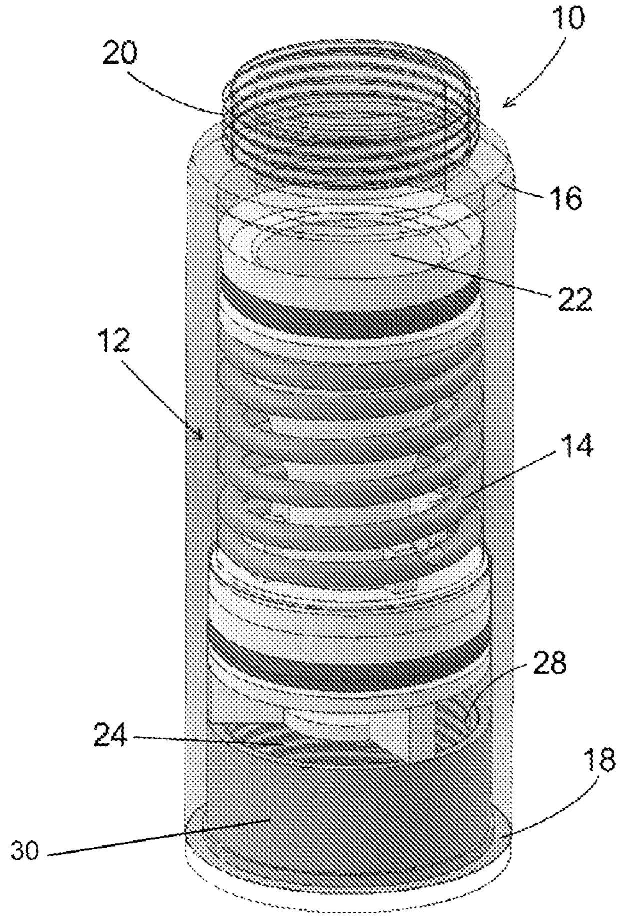
FIG. 1 is a perspective partially transparent view of one embodiment of a riser stem extension for a sprinkler riser extension kit according to one embodiment of the present invention.

FIG. 1 is a perspective view of one embodiment of a riser stem extension 10 for a sprinkler riser extension kit according to the present invention. The riser stem 10 has a top end 16 and a bottom end 18. The top end 16 has a first attachment means 20. The first attachment means 20 may be male threads configured to attach a sprinkler head (not depicted) to the top end 16 of the riser stem. The bottom end 18 has a cap 30. The cap 30 is preferably removable from the riser stem extension. In a preferred embodiment, the cap 30 is attached to the bottom end 18 of the riser stem extension by friction fit engagement. Other means for attaching the cap to the riser stem extension may also be suitable. The cap 30 has a second attachment means 28 configured for attachment to a riser of a sprinkler. The second attachment means may be female threads configured for threaded engagement with a riser of a sprinkler. Preferably, one or both of the first and second attachment means 20, 28 comprise a removable attachment means. Other structures for the first and second attachment means 20, 28 are possible within the scope of the invention, for example, means such as compression fitting, a pipe clamp, an adhesive, a weld, a spring-loaded connector, and a pipe fitting or junction. Whatever structure is used for attachment means, the outer surface or outer diameter of the riser stem extension should be sized to allow it to slide tightly, i.e. freely yet snugly with minimal friction, within and against the internal wall of the vertical cylindrical channel 58 (described below), when assembled and when subjected to a spring force or a pop-up force delivered by a conventional pop-up sprinkler.

Figure 2:
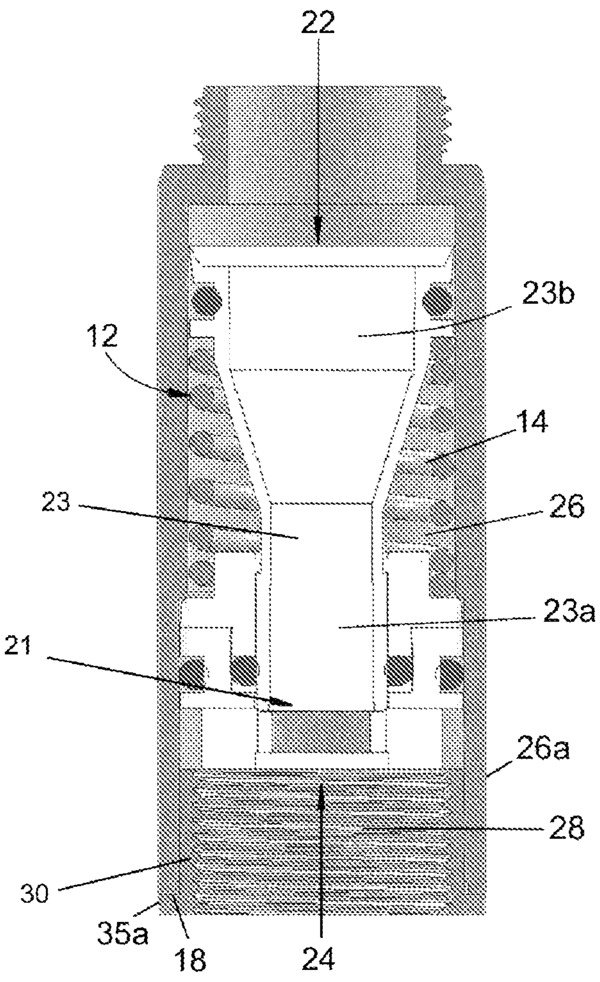
FIG. 2 is a cross-sectional view of the riser stem extension shown in FIG. 1.

FIG. 2 is a cross-sectional view the embodiment of the riser stem extension according to FIG. 1. The top end 16 is connected to the bottom end 18 by a hollow cylindrical body 26 of the riser stem 10. Housed within the hollow cylindrical body 26 is an internal pressure regulator assembly 12. The internal pressure regulator assembly has an inlet opening 24 and an outlet opening 22 integrally connected by an internal channel 23. The inlet opening 24 is proximate to the bottom end 18 of the riser stem. The inlet opening 24 is configured to receive water flowing in the irrigation system from a water source. The outlet opening 22 is proximate to the top end 16 of the riser stem. The outlet opening 22 is configured to release the flowing water to a sprinkler head (not depicted). The internal channel 23 is narrow at 23*a* proximate to the inlet opening and widens at 23*b* proximate to the outlet opening. The narrow portion 23*a* of the internal channel 23 can be cylindrical in shape and transition into a frustoconical shape at the widen portion 23*b*.

The internal channel 23 further comprises a valve assembly 21 proximate to the inlet opening 24. The valve assembly 21 is integrally connected to a spring 14 that circumvolves the exterior of the internal channel 23. The spring 14 is configured to exert a downward force on the valve assembly 21. Preferably, the spring 14 is configured to exert a constant fixed downward force on the valve assembly 21. As pressure builds at the inlet opening 24 of the internal channel 23, the valve assembly 21 exerts an opposing force compressing the spring. The opposing force exerted by the valve assembly 21 can partially or fully close the inlet opening 24 such that the downstream pressure is maintained at a preset constant pressure. The result of this is the pressure at the outlet opening 22 remains constant, regardless of the changing pressure at the inlet opening 24.

In a preferred embodiment, the spring 14 and valve assembly 21 are configured such that a constant fixed pressure is released from the outlet opening 22. The spring 14 and valve assembly 21 work in unison to ensure the pressure of the water released is constant at a fixed preset pressure.

In operation, pressurized water is received from a water source and introduced into the irrigation system. The pressurized water flows to an individual sprinkler assembly where it is introduced to the inlet opening 24 of the internal pressure regulator. The spring 14 exerts a constant downward force on the valve assembly 21 at the inlet opening 24. The downward force of the spring 14 on the valve assembly 21 ensures that the a flow path through the riser 10 remains open when the upstream pressure is less than the preset pressure. When the upstream pressure at the inlet opening 24 builds beyond the spring force, the valve assembly 21 begins exerting an opposing force against the spring 14 to compress the spring and further restrict the flow path through the riser stem extension 10. The result of this restriction as a function of upstream pressure is that the downstream pressure on the downstream side of the outlet opening 22 achieves the substantially constant fixed pressure, regardless of the upstream pressure.

The internal pressure regulator assembly 12 preferably releases water at a constant, fixed pounds per square inch (psi) of pressure. In one embodiment, the standard pressure is between 40 and 80 psi. In another embodiments, the standard pressure is set between 40 and 65 psi, or is set to a preferred fixed constant psi of 40 psi or 65 psi. Thus, in operation with the psi set to a preferred constant of 65 psi, the internal pressure regulator 12 works to maintain a downstream pressure of 65 psi, regardless of fluctuations of the upstream pressure above 65 psi.

Figure 3:
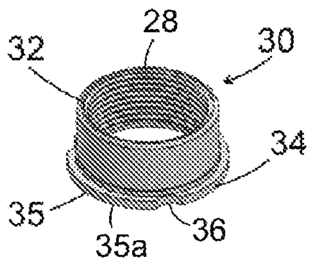
FIG. 3 is a perspective view of an embodiment of a cap removed from the riser stem extension of FIG. 1.
Figure 4:
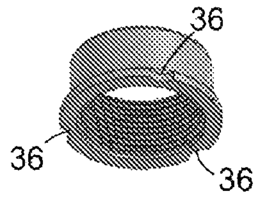
FIG. 4 is a bottom-up perspective view of the cap of FIG. 3.

FIGS. 3-7 are varying views of the cap 30 as removed from the riser stem extension 10. FIG. 3 is a perspective view of one embodiment of a cap 30 removed from the riser stem extension 10. FIG. 4 is a bottom-up perspective view of the cap 30. The cap 30 has a top end 32 and a bottom end 34. A shoulder 35 extends about the perimeter of the bottom end 34. The shoulder 35 is configured with at least one notch 36 formed therein. Preferably, there is a plurality of notches equally spaced apart around the shoulder 35. For example, FIG. 4 depicts three notches 36 formed in the shoulder 35 and spaced apart about the perimeter equally. As shown, there is roughly 120 degrees of separation between each of the three notches 36 depicted in FIG. 4. Alternative embodiments may have more or less than three notches 36 spaced apart equally about the perimeter of the shoulder 35.

The outer edge **35*a* of the shoulder 35 is configured to align substantially equally with the outer surface of the riser stem extension 10. The bottom end 18 of the riser stem extension 10 is configured to sit on the shoulder 35 of the cap 30 when engaged. In preferred embodiments, the width of the shoulder 35 is substantially equal to the thickness of the outer wall 26*a* of the hollow cylindrical body 26 at the bottom end 18**.

Figure 5:
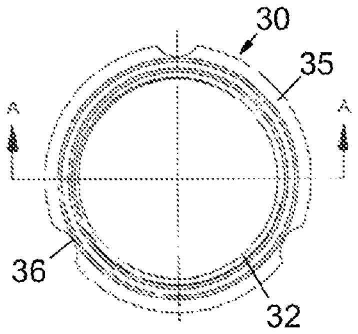
FIG. 5 is a top view of the cap of FIG. 3.
Figure 6:
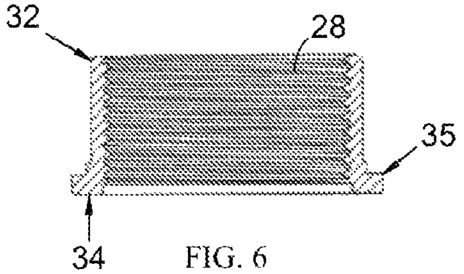
FIG. 6 is a cross-sectional view of the cap of FIG. 3 taken along sectional lines A-A of FIG. 5.

FIG. 5 is a top view of the cap 30 removed from the riser stem 10. FIG. 6 is a cross-sectional view of the cap 30 removed from the riser stem 10 taken along sectional lines A-A of FIG. 5. The cap 30 has second attachment means 28. Preferably, the second attachment means 28 is internal to the cap 30. In preferred embodiments, the second attachment means 28 is female threads configured for threaded engagement with a sprinkler riser of an existing sprinkler head (not depicted).

Figure 7:
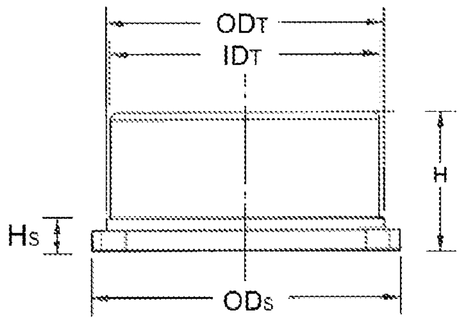
FIG. 7 is a side view of the cap of FIG. 5.

FIG. 7 is a side view of the cap 30 removed from the riser stem extension 10. The cap 30 has several preferred dimensions that are detailed next but these preferred dimensions are in no way meant to be limiting. The skilled artisan will readily recognize that the invention disclosed herein, including the individual component parts such as the cap 30, can be scaled up or down according to the required need. In one preferred embodiment, the cap 30 has a maximum outer shoulder diameter $OD_S$ that can equal 0.790 inches. The cap also has a maximum outer top diameter $OD_T$ that is less than the $OD_S$. In some embodiments, the $OD_T$ can equal 0.710 inches. The $OD_T$ is configured to substantially equal the internal diameter of the hollow cylindrical body 26 so as to be securely engaged therein through friction fit engagement. Further, the $OD_S$ is configured to substantially equal an outer diameter of the hollow cylindrical body 26 at the bottom end 18 so as to fit flush with the outer wall **26*a*** of the hollow cylindrical body. An inner diameter ID of the cap be equal to 0.690 inches. The height H of cap is preferably about 0.350 inches while the total height of the shoulder Hs is about 0.080 inches. While preferred dimensions have been provided, the invention can readily be scaled up or down depending on the need and the dimensions of the existing sprinkler head for which it is to be attached.

FIG. 8-12 are various perspective views of the riser stem extension 10 with the cap 30 removed from the bottom end 18. The internal pressure regulator assembly 12 is not depicted throughout these various views because the illustrations depict the riser stem as completely enclosed. Further, FIG. 13 provides a cross-sectional view with the internal pressure regulator assembly 12 removed for purposes of discussing preferred dimensions of the riser stem extension 10. The internal pressure regulator is housed within the internal channel 23 of the riser stem 10.

Figure 8:
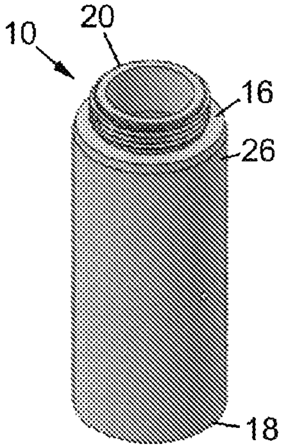
FIG. 8 is a perspective view of an embodiment of the stem from the riser stem extension shown in FIG. 1.
Figure 9:
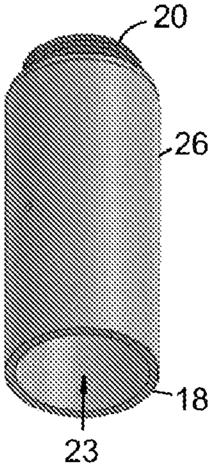
FIG. 9 is a bottom-up perspective view of the stem of FIG. 8.

FIG. 8 is a perspective view of the riser stem extension 10 having the cap 30 removed from the bottom end 18. FIG. 9 is a bottom-up perspective view of the riser stem extension 10 with the cap 30 removed therefrom. The top end 16 of the riser stem extension 10 is connected to the bottom end 18 by the hollow cylindrical body 26. The hollow cylindrical body defines an internal channel 23 extending between the top end 16 and the bottom end 18. The pressure regulator assembly 12 and the valve assembly 21 are contained within the internal channel 23 of the hollow cylindrical body 26. The hollow cylindrical body 26 provides protection from the environment for the internal mechanics of the riser stem extension 10.

Figure 10:
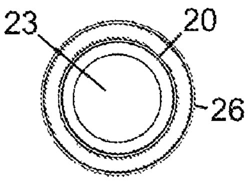
FIG. 10 is top view of the stem of FIG. 8.
Figure 11:
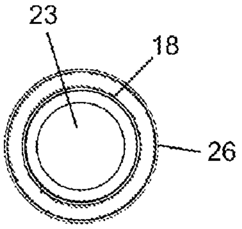
FIG. 11 is a bottom view of the stem of FIG. 8.

FIG. 10 is a top view of the riser stem extension 10 with the internal regulator assembly 12, the valve assembly 21 and the cap 30 removed therefrom. FIG. 11 is a bottom view of the riser stem extension 10 with the internal regulator assembly 12, the valve assembly 21 and the cap 30 removed therefrom. With the internal mechanics removed (i.e., the internal regulator 12 and valve assembly 21), the internal channel 23 is substantially unobstructed from between the top end 16 to the bottom end 18.

Figure 12:
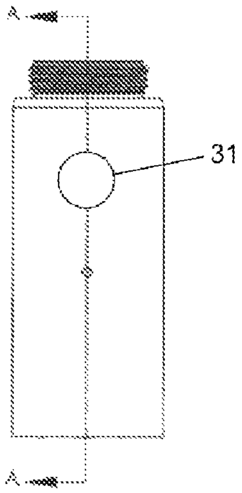
FIG. 12 is a side view of the stem of FIG. 8.
Figure 13:
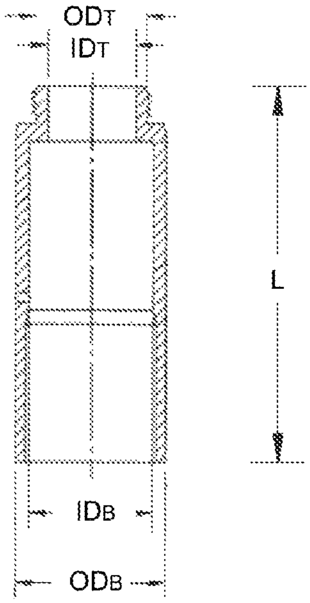
FIG. 13 is a cross-sectional view of the stem of FIG. 8 taken along sectional lines A-A of FIG. 12.

FIG. 12 is a side view of the riser stem extension 10. In some embodiments, the riser stem extension 10 may include an embedded psi indicator 31. The psi indicator 31 can display what the preset psi of the internal pressure regulator assembly 12 has been set to. In some embodiments, the psi indicator 31 can further include means for adjusting the psi of the internal pressure regulator assembly 12. The adjustment means can be a screw nob or other mechanism that is mechanically connected to the spring 14 to allow an operator to adjust the set compressive force exerted by the spring.

FIG. 13 is a cross-sectional view, taken along sectional lines A-A of FIG. 12, of the riser stem extension 10 with the internal regulator assembly 12, valve assembly 21 and cap 30 removed therefrom. The riser stem extension 10 has several preferred dimensions that will be discussed next.

However, these dimensions are provided for illustrative purposes only and not meant to limit the invention. The skilled artisan will readily recognize the invention can be scaled up or down depending on the need and the dimensions of the existing sprinkler head with which it is to be connected. The hollow cylindrical body 26 of the riser stem extension 10 has a length L that can vary depending on the length of extension needed to raise a sprinkler head. The length L can include any length but is preferably between 1.0 inch to 3.0 inches. The hollow cylindrical body 26 also has a maximum outer bottom diameter $OD_B$ preferably equal to the $OD_S$ of the cap 30. In preferred embodiments, the outer diameter $OD_B$ of the hollow cylindrical body 26 is 0.790 inches to match the $OD_S$ of the cap 30. In other preferred embodiments, the $OD_B$ of the hollow cylindrical body 26 can be slightly greater than the $OD_S$ of the cap 30, the $OD_B$ being 0.795 inches. The hollow cylindrical body 26 also has an internal bottom diameter $ID_B$ substantially equal to the $OD_T$ of the cap 30. In preferred embodiments, the $ID_B$ can be between 0.650 inches to 0.710 inches, depending on how tight the friction fit engagement between the cap 30 and the riser extension stem 10 is required. At the top end 16 of the riser stem extension 10, the first attachment means 20 can have an outer top diameter $OD_{TC}$ that is substantially equal to 0.580 inches and an inner top diameter $ID_{TC}$ substantially equal to 0.458 inches. The skilled artisan will recognize that the dimensions of the first attachment means 20 can vary depending on the dimensions of the external sprinkler head that must be attached thereto. Thus, the description of the preferred dimensions are in no way meant to limit the disclosed invention.

Figure 14:
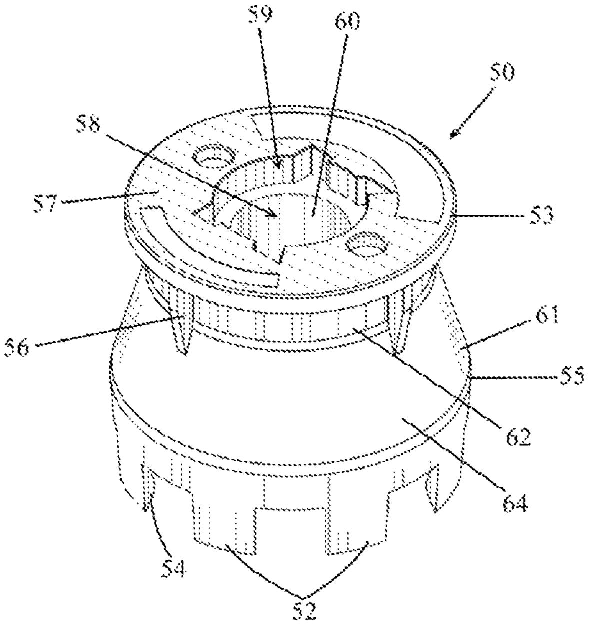
FIG. 14 is a perspective view of an embodiment of a gripping head according to the present invention.

FIG. 14 is a perspective view of an embodiment of a gripping head 50. The gripping head is removably attachable to a sprinkler. The lower end of the gripping head 50 provides means for removable attachment to a variety of commercially available pop-up sprinklers, such as those manufactured by Hunter®, Rainbird®, Toro® and others. The removable attachment means may comprises a threaded connection, a clamp, a friction fit, a locking device such as a tab-and-slot connection, or any combination of the foregoing.

In preferred embodiments, the removable attachment means of the gripping head 50 includes a plurality of flexible claws, or pawls 52, for facilitating removable attachment of the gripping head to the cap of the existing sprinkler. The pawls 52 are preferably evenly spaced about the perimeter of the lower end of gripping head 50. Each pawl 52 may be angled slightly inward. Alternatively, each pawl 52 may include a finger portion 54 that projects inwardly from an inner surface of each pawl toward the longitudinal axis of the gripping head. To project inwardly means that a finger portion 54 extends in a direction toward and perpendicular to an axis of rotation that is defined as an imaginary vertical line running through the center of the gripping head 50. Finger portion 54 preferably forms a rounded or wedge-shaped protrusion on the inner surface of each pawl. The dimensions of the pawl 52 are chosen to form a durable and resilient spring so that the pawl will flex and bend outward in response to downward pressure of the pawls against the sprinkler cap and then snap inward when the finger portion 54 of the pawl is forced over the top of the sprinkler cap. In this manner, each pawl 52 attaches tightly to the sprinkler cap, gripping the sprinkler cap and resisting detachment by detent action of the pawls.

On an upper portion of the gripping head, one or more outwardly projecting tabs 56 may be formed at one or more locations about the perimeter of the gripping head to provide a means for rotating the gripping head by hand. Outwardly projecting means the tabs 56 extend in a direction away from and perpendicular to the axis of rotation. In a preferred embodiment, four tabs 56 are formed about the gripping head, each spaced apart angularly by 90 degrees. Each tab 56 may be about 0.5 in. high and about 0.08 in. wide. Other numbers, arrangements, and dimensions of the tabs 56 are possible within the scope of the invention.

The gripping head has a channel 58 extending centrally through the top surface 57 of the gripping head from an upper rim 53 of the gripping head to a lower rim 55 of the gripping head. Channel 58 is preferably cylindrical, and may be concentrically aligned with the rotational axis described above. The riser stem extension 10 is movable through the channel 58. Upon sufficient pressure and the conventional pop-up action from the existing sprinkler, the riser stem extension 10 will move through the channel 58 to place a sprinkler head (not shown) a distance beyond the upper rim 53. Preferably, the height of the channel 58 is substantially equal to the length L of the riser stem extension 10 and an inner diameter (or other geometry) that allows for snug passage of the riser stem extension 10 therethrough, as a piston through a cylinder.

The top surface 57 may have a geometric design 59 surrounding the channel 58. The geometric design 59 is configured for tight fitment between the top surface 57 and a sprinkler head (not shown). The geometric design 59 may also be a logo or other such design.

In one embodiment, the gripping head may be constructed with one or more interior voids formed between an inner wall 60 of the gripping head and an outer wall 61 of the gripping head. The inner wall 60 of the gripping head defines a boundary around the vertical channel 58. The outer wall 61 of the gripping head forms an exterior side surface all around the perimeter of the gripping head. The interior voids reduce the amount of material needed to form the gripping head, to thereby advantageously reduce the weight of the gripping head and also minimize manufacturing costs.

The outer wall 61 may be cylindrical, rectangular, or another multi-sided geometry, and is preferably ergonomically designed to facilitate grasping or manipulating by hand. Outer wall 61 may also be partially conical or circular, and may combine various of the foregoing or following geometrical features as a means for manual operation. For example, in the depicted embodiment, the outer wall 61 comprises that part of the exterior surface of the gripping head 50 that lies between the upper rim 53 and the lower rim 55. This part of the exterior surface includes a cylindrical portion 62 and a conical portion 64. This particular structure allows an operator to get a firm grip on gripping head by grasping and pressing thumb and forefingers underneath the upper rim, above the conical portion, and against the tabs for reliable handling, pressing, lifting, and rotating.

Figure 16:
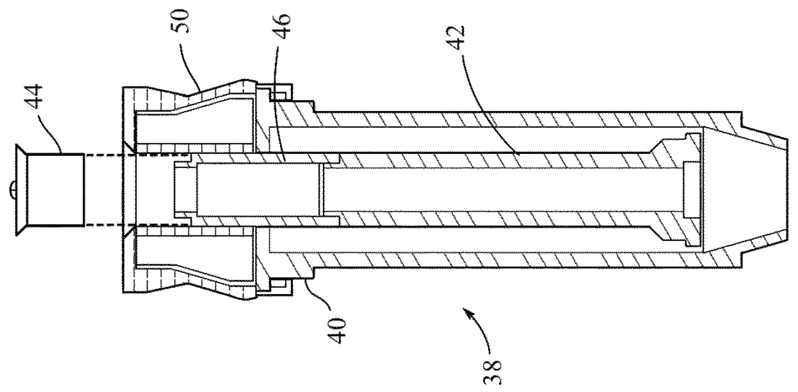
FIG. 16 is a cross-sectional side view of a basic embodiment of the sprinkler riser extension kit in the same condition of use as shown in FIG. 15 and taken along section C-C.
Figure 15:
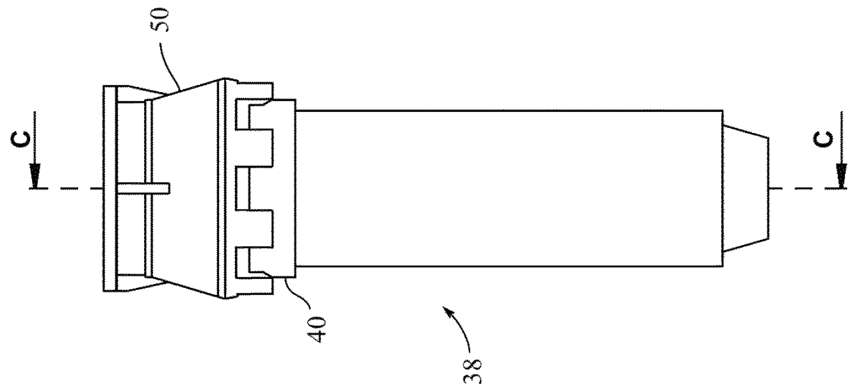
FIG. 15 is a side view of one embodiment of a sprinkler riser extension kit in condition of use as installed on a conventional pop-up sprinkler.

FIG. 15 is a side view of a basic embodiment of a sprinkler riser extension kit in an assembled condition as installed on a conventional pop-up sprinkler. FIG. 16 is a cross-sectional side view of this basic embodiment, showing the arrangement of the internal parts of the sprinkler riser extension kit in relation to the conventional pop-up sprinkler. As is known, the conventional pop-up sprinkler 38 includes a cap 40, an internal riser 42 and a sprinkler head 44 removably engaged to the top end of the riser 42. The griping head 50 is designed to fit over the cap 40 of the existing pop-up sprinkler 38. A riser extension, such as the basic extension 46 shown in FIG. 16 or the riser stem extension 10 described above, is arranged between the sprinkler head 44 and the top end of the riser 42. The sprinkler head 44 attaches to the top end of the basic extension 46. In embodiments having the riser stem extension 10 described above, the sprinkler head 44 is attachable to the first attachment means 20, as described further above.

Exemplary embodiments of the invention have been disclosed in an illustrative style. Accordingly, the terminology employed throughout should be read in a non-limiting manner. Although minor modifications to the teaching herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed:

1. A sprinkler riser extension kit for raising a sprinkler head of an existing sprinkler assembly that is operational without the kit, the sprinkler riser extension kit comprising:

a gripping head having an upper end connected to a lower end by a hollow channel, wherein the gripping head has means for attachment over an outer surface of a cap of the existing sprinkler assembly; and a riser stem extension that encloses an internal pressure regulator assembly and is slidable through the hollow channel, the riser stem extension having a top end with a first attachment means, a bottom end opposite the top end, and a removable cap engaged to the bottom end, the removable cap having a second attachment means, wherein the first attachment means is configured to attach the top end to a head of the existing sprinkler assembly and wherein the second attachment means is configured for attachment to a riser of the existing sprinkler assembly from which the head has been detached;

the internal pressure regulator abutting the removable cap within the riser stem extension and having an inlet opening proximate the bottom end and in fluid communication through an internal channel with an outlet opening proximate the top end.

2. The sprinkler riser extension kit of claim 1, wherein the pressure regulator assembly is configured to provide a substantially fixed constant pressure downstream of the outlet opening when fluid pressure at the inlet opening exceeds the fixed constant pressure.

3. The sprinkler riser extension kit of claim 2, wherein the fixed constant pressure is set to 65 pounds per square inch.

4. The sprinkler riser extension kit of claim 2, wherein the fixed constant pressure is set to 40 pounds per square inch.

5. The sprinkler riser extension kit of claim 1, wherein the internal pressure regulator assembly further comprises a valve assembly integrally connected to a spring that circumvolves an exterior surface of the internal channel.

6. The sprinkler riser extension kit of claim 5, wherein the spring is configured to exert a constant fixed downward force on the valve assembly.

7. The sprinkler riser extension kit of claim 6, wherein the valve assembly exerts an opposing force against the spring.

8. The sprinkler riser extension kit of claim 7, wherein the downward force of the spring and the opposing force of the valve assembly are configured to maintain a constant fixed fluid pressure at the outlet opening when the kit is under pressurized fluid flow from an external fluid source.

9. The sprinkler riser extension kit of claim 5, wherein the spring maintains the valve assembly in an open position when the kit is not under pressurized fluid flow.

10. The sprinkler riser extension kit of claim 9, wherein the valve assembly is configured to close when pressure at the inlet opening exceeds a preset pressure limit.

11. The sprinkler riser extension kit of claim 1, wherein the removable cap is configured to frictionally engage the bottom end of the riser stem extension.

12. The sprinkler riser extension kit of claim 1, wherein the second attachment means of the removable cap comprises female threads configured for threaded engagement with the sprinkler riser.

13. The sprinkler riser extension kit of claim 1, wherein the removable cap further comprises a shoulder formed around a lower end of the removable cap.

14. The sprinkler riser extension kit of claim 13, wherein an outer diameter of the shoulder is substantially the same as an outer diameter of the bottom end of the riser stem extension.

15. The sprinkler riser extension kit of claim 1, wherein the pressure regulator assembly is operable between a standard pressure of 40 to 80 pounds per square inch.

16. The sprinkler riser extension kit of claim 1, wherein the length of the hollow channel is substantially equal to the height of the riser stem extension.

17. The sprinkler riser extension kit of claim 16, wherein the length of the hollow channel is between 1.0 inches to 3.0 inches.

18. The sprinkler riser extension kit of claim 1, wherein the attachment means for the gripping head comprise a plurality of pawls projecting from the lower end of the gripping head.

19. The sprinkler riser extension kit of claim 18, wherein the plurality of pawls are spaced evenly about the lower end of the gripping head.

* * * * *